(12) United States Patent
Graves

(10) Patent No.: US 10,178,103 B2
(45) Date of Patent: *Jan. 8, 2019

(54) SYSTEM AND METHOD FOR ACCESSING A SERVICE

(71) Applicant: HEWLETT PACKARD ENTERPRISE DEVELOPMENT LP, Houston, TX (US)

(72) Inventor: David Andrew Graves, Monte Sereno, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,035

(22) Filed: Feb. 1, 2017

(65) Prior Publication Data

US 2017/0149791 A1  May 25, 2017

Related U.S. Application Data

(63) Continuation of application No. 13/980,849, filed as application No. PCT/US2011/022297 on Jan. 24, 2011, now Pat. No. 9,590,997.

(51) Int. Cl.
*G06F 21/33* (2013.01)
*H04L 29/06* (2006.01)

(52) U.S. Cl.
CPC .......... *H04L 63/102* (2013.01); *G06F 21/335* (2013.01); *H04L 63/101* (2013.01)

(58) Field of Classification Search
CPC ............................ H04L 63/102; H04L 63/101
USPC ......................................................... 726/28
See application file for complete search history.

(56) References Cited

U.S. PATENT DOCUMENTS

| 7,308,475 | B1 | 12/2007 | Pruitt et al. |
| 7,801,771 | B1 | 9/2010 | Sirota et al. |
| 2001/0020249 | A1 | 9/2001 | Shim |
| 2002/0147766 | A1 | 10/2002 | Vanska et al. |
| 2003/0163576 | A1 | 8/2003 | Janssen |
| 2005/0021858 | A1 | 1/2005 | Ruston et al. |
| 2007/0073880 | A1 | 3/2007 | Krishnakumar |
| 2007/0226294 | A1 | 9/2007 | Pruitt et al. |

(Continued)

FOREIGN PATENT DOCUMENTS

| CN | 1360782 A | 7/2002 |
| CN | 101282330 A | 10/2008 |

(Continued)

OTHER PUBLICATIONS

International Searching Authority, "Notification of Transmittal of the International Search Report and the Written Opinion", PCT/US2011/022297, dated Sep. 2, 2013. 9 pages.

*Primary Examiner* — Eleni A Shiferaw
*Assistant Examiner* — Angela R Holmes
(74) *Attorney, Agent, or Firm* — Mannava & Kang, P.C.

(57) ABSTRACT

According to one example of the present invention, there is provided, a method of accessing a service. The method comprising: receiving, from a requesting user, a request for a number of accessing users to have access to the service, generating service access data associated with the service, providing, to the requesting user, the generated service access data for distribution to the accessing users, receiving, from an accessing user, service access data, determining, based in part on the received service access data, whether the service can be provided, and where it is so determined, providing the service to the accessing.

12 Claims, 5 Drawing Sheets

(56) References Cited

U.S. PATENT DOCUMENTS

| | | |
|---|---|---|
| 2007/0233820 A1 | 10/2007 | Schneider |
| 2008/0201293 A1 | 8/2008 | Grosset et al. |
| 2009/0249370 A1 | 10/2009 | Liu et al. |
| 2010/0005156 A1 | 1/2010 | Wesby |
| 2010/0023491 A1 | 1/2010 | Huang |
| 2010/0050251 A1 | 2/2010 | Speyer |
| 2010/0198948 A1 | 8/2010 | Yang et al. |
| 2014/0041055 A1 | 2/2014 | Shaffer et al. |
| 2014/0293313 A1 | 10/2014 | Kakapuri |

FOREIGN PATENT DOCUMENTS

| | | |
|---|---|---|
| CN | 101729574 A | 6/2010 |
| EP | 0720091 | 7/1996 |

SYSTEM AND METHOD FOR ACCESSING A SERVICE

This application is a Continuation of commonly assigned and copending U.S. patent application Ser. No. 13/980,849, filed Jul. 19, 2013, now U.S. Pat. No. 9,590,997, which is a national stage filing under 35 U.S.C. § 371 of PCT application number PCT/US2011/022297, having an international filing date of Jan. 24, 2011, the disclosures of which are hereby incorporated by reference in their entireties.

BACKGROUND

For service providers the provisioning of services, such as IT services, to their clients can be a particularly complex and time-consuming task, especially where a client organization has multiple users that are to be given access to the services.

To provision a service to users of a client organization, a service provider has to identify which client organization users (hereinafter referred to generally as users) are to be given access to the service. In many cases the service provider also has to identify each user's role or required level of access (such as 'unprivileged user', 'supervisor', 'application administrator', 'database administrator', etc.) for the service. The service provider then has to configure the service to give each user the appropriate level of access. Configuring may typically include, for example, assigning to each user a username, generating a password, and communicating the assigned username and generated password to each user.

Typically the client organization provides lists identifying which users are to be given access to the service and, where appropriate, the corresponding level of access required. The service provider uses the provided lists and, in a largely manual operation, configures the service for each user.

In large client organizations, where many hundreds, thousands, or hundreds of thousands, of users are to be given access to a service the provisioning, or 'on-boarding', process is typically a complex, time-consuming, and largely manual process. Furthermore, as users leave or join a client organization the list of users provided by the client organization to the service provider may quickly become out-of-date, creating further difficulties.

BRIEF DESCRIPTION

Embodiments of the invention will now be described, by way of non-limiting example only, with reference to the accompanying drawings, in which.

DETAILED DESCRIPTION

In the past, service providers had to configure their service platforms in order to enable client organization users to access and use a service. However, as will become apparent from the following description, examples and embodiments of the present invention provide new and more efficient ways to provision services to users.

Figure 1:
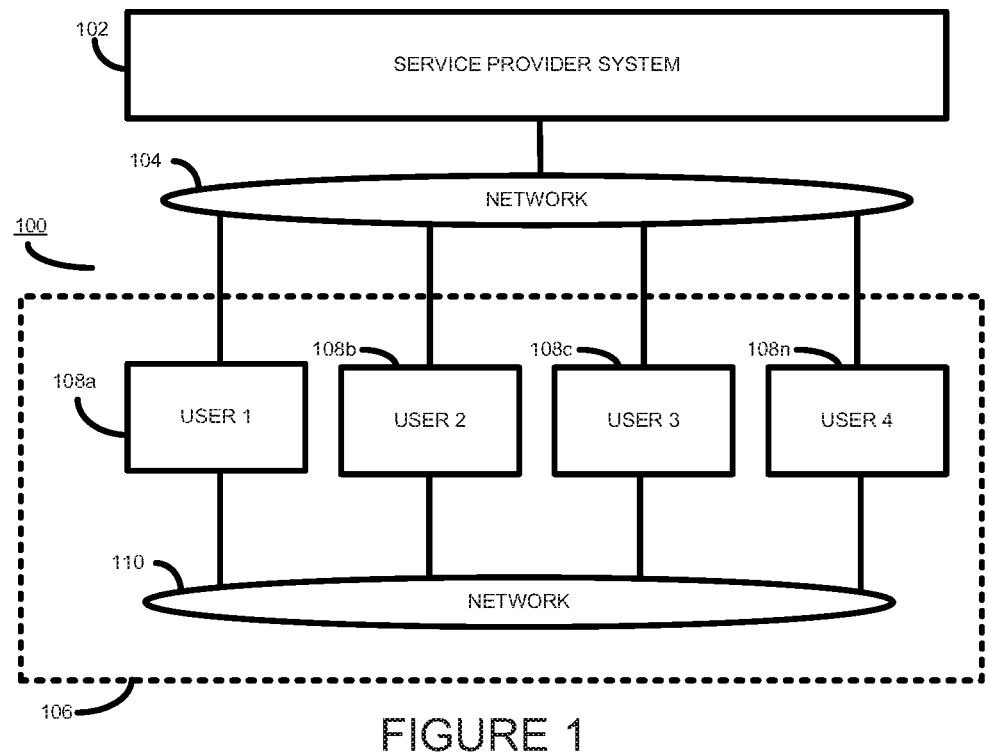
FIG. 1 is a simplified block diagram of a system according to an example of the present invention.
Figure 2:
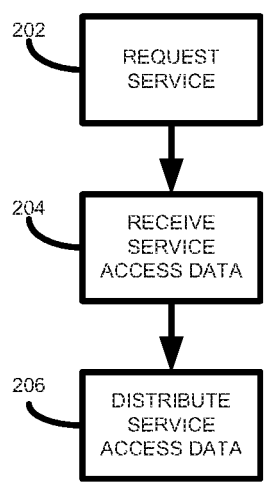
FIG. 2 is a simplified flow diagram outlining an example method of operating elements of a system according to an example of the present invention.
Figure 3:
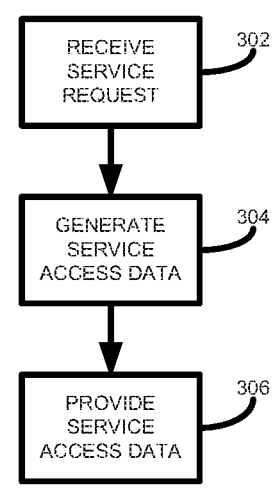
FIG. 3 is a simplified flow diagram outlining an example method of operating elements of a system according to an example of the present invention.

Referring now to FIG. 1 there is shown a simplified block diagram of a system 100 according to an example of the present invention. Operation of the system 100 will be further described with reference to the flow diagrams shown in FIGS. 2, 3, 4a, and 4b.

The system 100 comprises a service provider system 102 which provides a service, across a network 104, to users of terminals 108a to 108n. In one example the network 104 may be a private network, such as a private cloud network, WAN, or the like. In another example the network 104 may be a public network, such as the Internet, a public cloud network, or the like.

The service may be, for example, an IT service, examples of which may include a help desk service, application services, a travel reservation service, a human resource management service, and the like. The service provider system 102 may include, for example, computer hardware, computer software, networking equipment, and the like. The terminals 108a to 108n may include, for example, personal computers (PCs), laptop, netbook, or other mobile computers, computer servers, virtual terminals, mobile computing devices, mobile telephones, smartphones, or the like. In other examples the service provider system 102 may provide multiple services.

The terminals 108a to 108n terminal may be, for example, terminals of a client organization 106 and may be connected to, or may connect to, a client organization network 110.

In the present example, one of the users (hereinafter referred to as a requesting user) is responsible for obtaining a service from the service provider system 102 for use by users of client organization. For example, the requesting user may be an administrator or manager within, or working for, the organization 106.

At 202 the requesting user, using a terminal such as terminal 108a, makes a service request to the service provider system 102. In one example the request is made electronically, for example by the requesting user using a terminal to connect to a service provider web page, by sending an email, or in any other appropriate manner. The service request identifies the service being requested and the maximum number of client organization users who are to be given access to the service. In one example the service request additionally identifies the organization 106.

In one example the service request identifies a number of different user roles and further identifies the maximum number of users that are to have access to the service with each user role. For example, the service request may indicate that a maximum of 10,000 users are to be allowed to access the service with 'type 1' roles, and that a maximum of 15 user are to be allowed to access the service with 'type 2' roles. In one example, separate requests may be made for each role type. In a further example, a single request may include multiple requests for each role type.

Each role type may determine, for example, the service functionality available to users of each role type or may, for example, define or be associated with a level of access to the service (or service access level). For example, a type 1 role may be a 'standard' user role, whereas a type 2 role may be a 'privileged' or 'administrator' type role. Different role types may therefore have access to different service functionality. In other examples additional role types may be available for a given service.

At 302 the service provider system 102 receives the service request and, providing that the requested services can be provided to the requested number of users, generates (304) service access data. The service access data includes information or data enabling a user to subsequently access the requested service, as will be described below in greater detail.

In one example, the service access data includes an identifier for a role type requested by the requesting user. In a further example, where multiple role types are requested, the service access data includes an identifier for each role type requested by the requesting user. In a further example, the service access data may additionally include a universal resource indicator (URI) or other network address at which the service can be accessed. In a yet further example, the service access data may include a URI that identifies both the address of the service to be access and a role identifier.

In at least one example the generated service access data is generated based in part on a characteristic of the requesting user. For example, a characteristic of the requesting user may include, for example, the name of the requesting user's organization, the domain name of the requesting user's organization, the address of the requesting user's organization, etc., as will be described in further detail below.

At 306 the service provider system 102 provides the generated service access data to the requesting user in any appropriate manner, including, sending the service access data in an email, and by causing the service access data to be displayed on the terminal of the requesting user.

At 204 the requesting user receives the service access data and then distributes (206) the service access data to different client organization users who are to have access to the requested service. The distribution of the service access data may be performed in any suitable manner including, for example, sending an email containing all, or a portion of, the received service access data, sending a letter or written memo detailing all, or a portion of, the service access data, sending a short message system (SMS) message, and so on. Where different role types were requested, the requesting user may send service access data for each role type to a different group of users. For example, the requesting user may send service access data for type 1 role users only to those users identified by the requesting user as requiring a type 1 role access to the service.

Figure 4A:
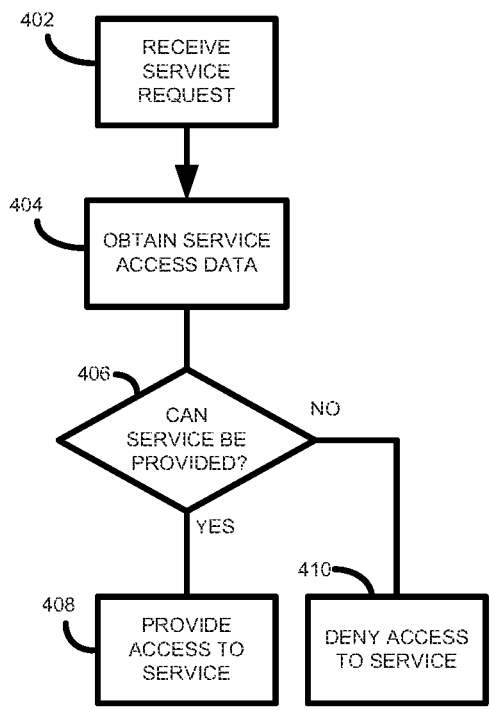
FIG. 4a is a simplified flow diagram outlining an example method of operating elements of a system according to an example of the present invention.

Once a user, such as a user 108*b* to 108*n*, has received service access data the user may access the service identified thereby, as will now be described with reference to FIG. 4*a*.

A user, such as a user using terminal 108*b*, accesses a service by connecting to a URI or other network address associated with the service provider system 102. In one example the address is the address of a service control access module or interface through which the requested service is accessed. In another example the address is the address of a web application providing the service.

In one example the URI or network address used to access the service is provided in the received service access data. The terminal 108*b* connects to the URI and is requested to provide a role type identifier. In the example where the URI includes a role type identifier the user may not have to separately provide the role type identifier.

The service provider system 102 receives (402) the service access request and obtains (404) service access data. The obtained service access data identify the service to be accessed. In one example, the obtained service access data additionally identify the organization or the requesting user requesting the service.

At 406 the service provider system 102 determines whether the requested service can be provided to the user. In one example, the determination may be made, for example, by determining whether the service access data are valid. In another example, the service provider system 102 keeps a track of the number of users previously given access to a service using given service access data. The service provider system 102 may then check that the number of users does not exceed the requested maximum number of registered users for a particular role type. In other examples, different or additional checks may be made to determine whether access to a service may be granted. Such checks may include, for example, identity checks, security checks, and the like.

If the service provider system 102 determines (406) that the service can be provided the service provider system 102 grants (408) the user access to the service. Otherwise, the service provider system 102 denies (410) the user access to the service.

Such a system may be particularly advantageous where client users are to be given access to a service, for example, on a one-off of infrequent use basis.

Figure 4B:
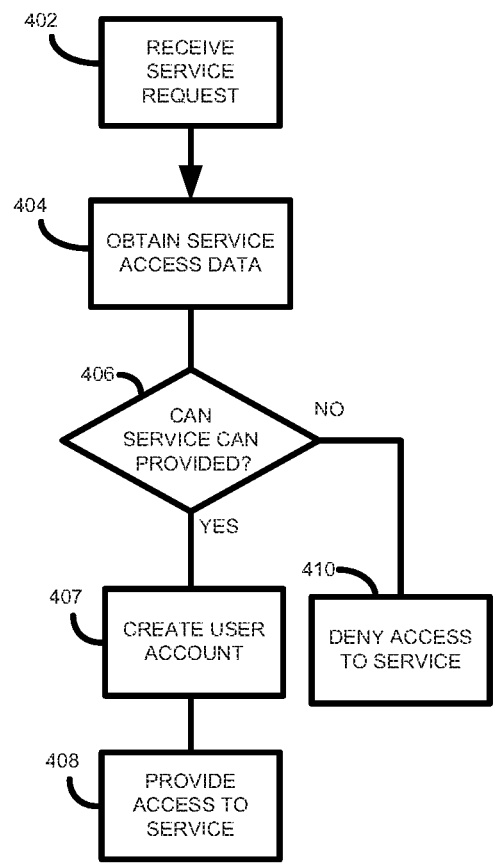
FIG. 4b is a simplified flow diagram outlining an example method of operating elements of a system according to an example of the present invention.

In a further example, shown in FIG. 4*b*, if the service provider system 102 determines (406) that the service can be provided the service provider system 102 creates (407) a user account for the user. The service provider system 102 may, for example, request a username and a password from the user and create a user account based on the provided details. A user requesting subsequent access to the service may thereafter be requested to provide details stored in their user account, such as username and password, in order to be authenticated to access the service.

Such a system may be particularly advantageous where client users are to be given access to a service that they may use multiple times.

In such systems, it is particularly advantageous that client users may be given access to a service without the service provider having to manually configure or provision the service to the users.

Figure 5A:
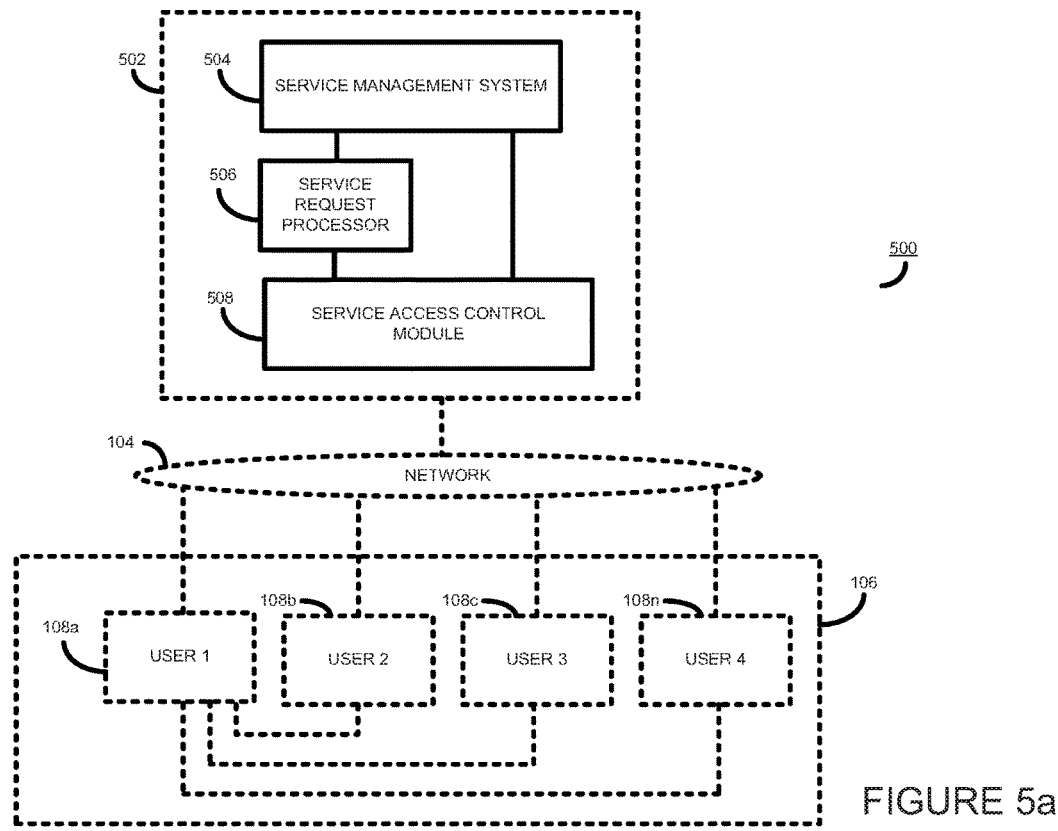
FIG. 5a is a simplified block diagram of a system according to an example of the present invention.
Figure 6:
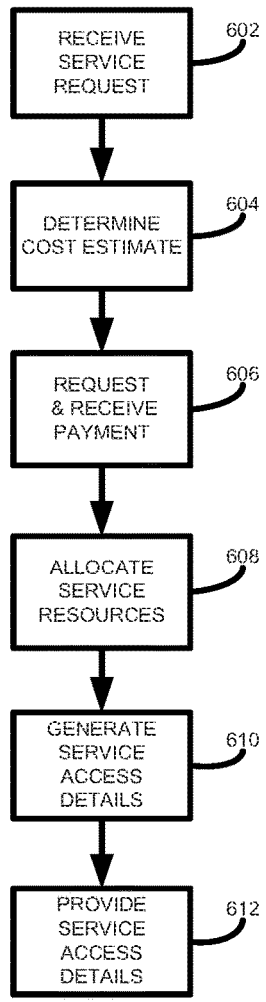
FIG. 6 is a simplified flow diagram outlining an example method of operating elements of a system according to an example of the present invention.

Referring now to a FIG. 5*a* there is a shown a service provider system 502 in greater detail according to an example of the present invention. The service provider system 502 includes a service management system 504, a service request processor 506, a service access control module 508, and an account data store 510. Operation of elements of the system 500 is further described below with additional reference to FIGS. 6 and 7.

Figure 5B:
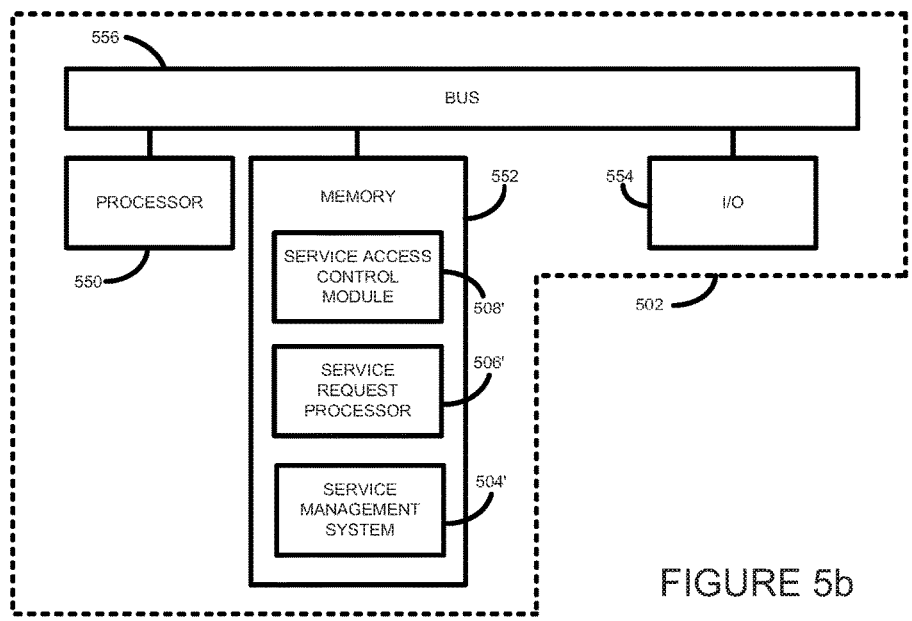
FIG. 5b is a simplified block diagram of a system according to an example of the present invention.

In one example, illustrated in FIG. 5*b*, at least part of the service provider system 502 may be implemented using a microprocessor 550 coupled, via a communication bus 556, to a memory 552 and an input/output module 554. The memory 552 stores service management system instructions 504', service order processor instructions 506', and service access control module instructions 508'. The instructions 504', 506', and 508' are processor understandable instructions that when executed by the processor 550 provide functionality of the service management system 504, the service order processor 506, and the service access control module 508, as described further below.

In one example the service control access module 508 is implemented as a web portal through which access to the service is controlled. The service control access module 508 receives (602) a service request from a requesting user, such as the user of terminal 108a. The service control access module 508 may be provided, for example, as a web portal to which the requesting user may connect to request access to one or more services through use of a web browser application running on the terminal 108a. As previously described, the service request may indicate one or more role types and the maximum number of users who may register for access to the service for each role type.

The service request processor 506 processes the received request to determine (604) the cost, or a cost estimate, for providing the requested service. In one embodiment the service request may include additional data indicating, for example, the length of time that the requested service is required, the level of service support required, the quality of service required, and so on. In some examples, a requested service may be provided for no cost. In other examples the cost may be a maximum cost based on the requested number or users in the different requested roles, or an estimated cost based on assumed or expected service usage patterns, etc.

At 606 the service request processor 506 requests payment from the requesting user. Payment may be made, for example, using a credit card, an e-payment account, or in any other suitable manner.

In one example, where no payment is required for use of the service the steps 604 and 606 may be omitted.

At 608 the service request processor 506 allocates resources or suitably configures the service provider system 502 to provide the requested service for the maximum number of registered users.

In one example the allocation of resources may be performed with no or a small delay, for example, if the service provider 502 already has the appropriate resources. In another example there may be a longer delay if the service provider has to acquire or re-allocate additional resources in order to provide the requested service.

At 610 the service request processor 506 generates service access data to enable users to access the requested service. In one example the service access data include a service role identifier for each requested role type. It should be noted that in this example the service role identifier is the same for each different user who is to be given access to the service.

Advantageously, this significantly simplifies the subsequent distribution of the service access data to the users, as all role type 1 users can be sent the same service access data. A service role identifier may, in one example, be an identifier such as a large random number, an alphanumeric identifier, a text string, the result of a cryptographical operation, a token, or other suitable identifier.

In one example the service role identifier identifies a user role type for a given service. In another example the service role identifier identifies both the user role type and the service to which the user role type is associated.

At 612 the generated service access data are provided to the requesting user in any suitable manner, as previously described. Examples of service access data that may be sent to a requesting user are shown below in Tables 1 and 2.

TABLE 1

Example Service access data
SERVICE ACCESS DATA

| | |
|---|---|
| Service requested | Travel Reservation System |
| Service URI | http://www.hp.com/services/TravelService/ |
| No. of type 1 role users requested | 40 000 |
| Service role identifier (Type 1 role) | 123456789 |
| No. of type 2 role users requested | 15 |
| Service role identifier (Type 2 role) | 987654321 |

TABLE 2

Example Service access data
TRAVEL RESERVATION SERVICE ACCESS DATA

| | |
|---|---|
| Travel Service type 1 role URI | http://www.hp.com/servicesportal/?ID=123456789 |
| Travel Service type 2 role URI | http://www.hp.com/servicesportal/?ID=987654321 |

The requesting user may then distribute the service access data, or a part thereof, to the different users who are to be given access to the service. For example, all type 1 role users may be sent an email with the service role identifier '123456789', whereas all type 2 role users may be sent an email with the service access type 2 role identifier '987654321'.

Advantageously for the service provider, it is easier for the requesting user to distribute the service role identifier to the appropriate users since the requesting user is most likely to have access to the most up-to-date details of who the intended users of the service are.

Once a user has received a service role identifier they may connect to the service provider system 502 to access the service. In the present example the URI provided in the service access data is a URI associated with the service control access module 508.

Figure 7:
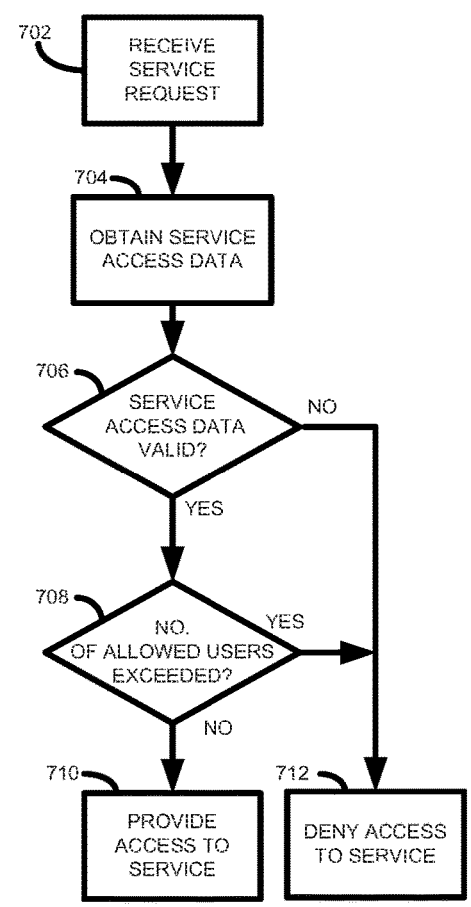
FIG. 7 is a simplified flow diagram outlining an example method of operating elements of a system according to an example of the present invention.

Referring now to FIG. 7, there is shown a flow diagram outlining example operation of a service provider system 502 according to one example. At 702 the service control access module 508 receives a service access request from a user. As previously described, the service access request may be a result of a user connecting to the URI provided in the received service access data using a suitable web browser application.

At 704 the service control access module 508 obtains the service role identifier from the user requesting access to the service. As previously mentioned, in one example this may be supplied as part of the URI used by the user to connect to the service control access module 508 or may, in another example, be supplied by a user following connection to the service control access module 508.

At 706 the service control access module 508 determines whether the obtained service role identifier is valid. In one example, the service role identifier is determined as being valid if it corresponds to a service role identifier previously generated by, or on behalf of, the service provider system 502.

In one example the service control access module 508 may perform additional security checks, such as determining whether the IP address of the user requesting access to the service is in the same network domain as the IP address of the requesting user, checking whether an email address given by the user requesting access to the service is in the same domain as the email address of the requesting user, etc.

If the service control access module 508 is not able to determine that the obtained service role identifier is valid then it denies (712) access to the service.

If the service control access module 508 does determine (706) that the obtained service role identifier is valid it makes a further check (708) to determine whether the maximum number of users allowed to use the service, as requested by the requesting user, has been exceeded. If the number of allowed users has been exceeded the service control access module 508 denies (712) the user access to the service.

In one example, if the number of allowed users has been exceeded the service control access module 508 may provide (710) access to the service by charging the client organization for the additional access.

Otherwise, the user is provided access to the service (710) in any appropriate manner. For example, access to the service may be provided by redirecting the user's web browser to a URI of an application in the service provider system 502 providing the requested service. In one example the redirected network address may, for example, include a temporary identifier to enable the user to access the service only during a single connection attempt.

Figure 8:
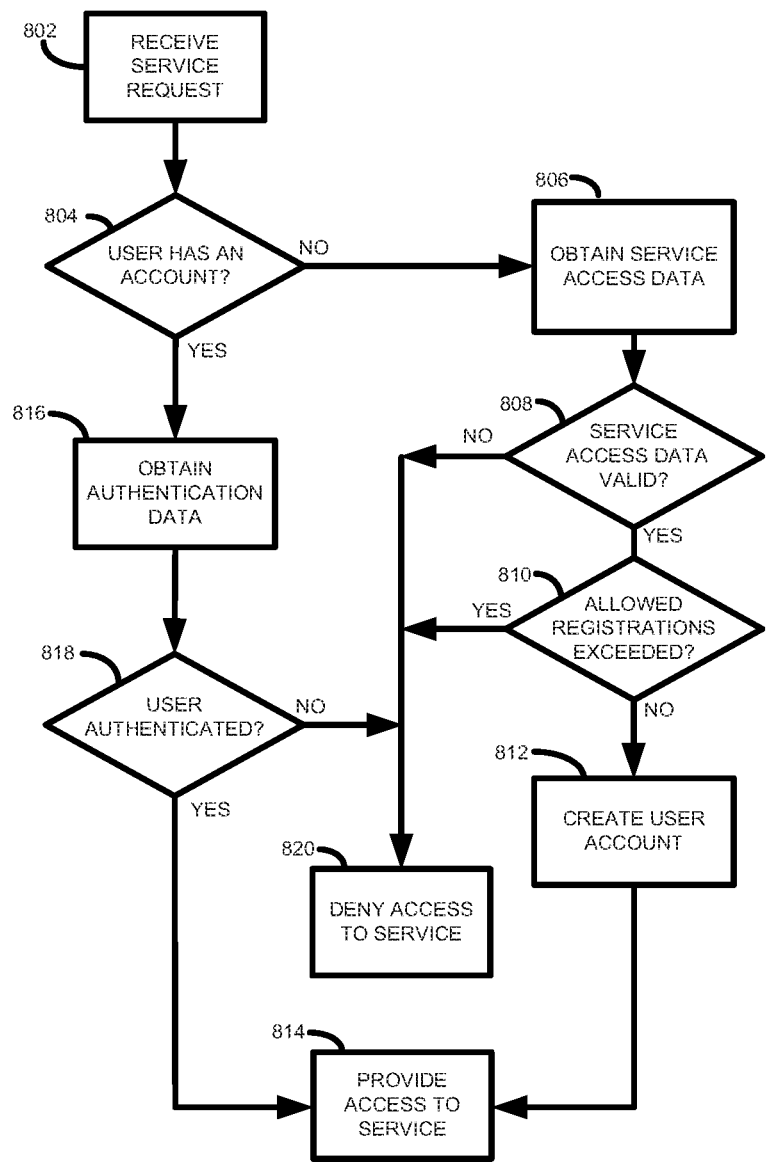
FIG. 8 is a simplified flow diagram outlining an example method of operating elements of a system according to an example of the present invention.

Turning now to FIG. 8, there is a shown a flow diagram outlining example operation of a service provider system 502 according to a further example of the present invention.

At 802 the service control access module 508 receives a service access request from a user. As previously described, the service access request may be a result of a user connecting to the URI provided in the received service access data using a suitable web browser application.

At 804 the service control access module 508 determines whether the user has a previously created user account. The service control access module 508 may determine this, for example, by asking a user to either enter some authentication data, such as a username or password, associated with their user account, or to indicate that they do not have an account but would like to create one in order to access the requested service.

If, at 804, the service control access module 508 determines that the user wishes to create a user account the service control access module 508 first obtains (806) a service role identifier from the user. As previously mentioned, this may, in one example, be included in the URI used by the user to connect to the service control access module 508 or, in another example, be supplied separately by the user to the service control access module 508.

At 808 the service control access module 508 determines whether the obtained service role identifier is valid. In one example, the service role identifier is determined as being valid if it corresponds to a service role identifier previously generated by, or on behalf of, the service provider system 502.

In one example the service control access module 508 may perform additional security checks such as determining whether the IP address of the user requesting access to the service is in the same network domain as the IP address of the requesting user, checking whether an email address given by the user requesting access to the service is in the same domain as the email address of the requesting user, sending an email to the user's email address with a URI to confirm the user's registration, etc.

If the service control access module 508 is not able to determine (808) that the obtained service role identifier is valid then it denies (820) access to the requested service.

If the service control access module 508 does determine (808) that the obtained service role identifier is valid it makes a further check (810) to determine whether the number of allowed user registrations for the service has been exceeded. The number of allowed user registrations is the number of users requested by the requesting user for a given service role. If the number of allowed user registrations has been exceeded the service control access module 508 denies (820) the user access to the requested service.

In one example, if the number of allowed users has been exceeded the service control access module 508 may provide (710) access to the service by charging the client organization for the additional access.

If the service role identifier is valid and the number of allowed user registrations has not been exceed, the service control access module 508 creates (812) an account for the user. The account may be stored in an account data store or memory (not shown). The account creation may, for example, request a username and a password from the user to be used to authenticate the user when accessing the service on subsequent occasions. In some examples the step of account creation may additionally request additional personal information from the user, such as telephone number, job title, address, and so on. The service control access module 508 stores in the user account, or otherwise associates with the user account, the service role type associated with the obtained service role identifier, or other data indicating the service access level the user has with respect to a service. In one example the user account may store multiple service role identifiers.

In one example the service control access module 508 generates a token, cookie, or the like that the user may use for authentication purposes when accessing the service on subsequent occasions.

In one example, if, during the process of creating the account the service control access module 508 determines that the user already has an account no further account is created for the same user, and the user may either be denied access to the service or may be passed directly to the authentication step 816. In this way, a user who has already created an account may be prevented from accessing the service on a subsequent occasion using only the service role identifier. This may be important, for example, to ensure that the desired number of users have access to the service.

Once the user account has been successfully created, the service control access module 508 provides (814) access to the requested service.

If, at 804, the user indicates that they have a previously created user account the service control access module 508 obtains (816) authentication data, such as a username and password, or other appropriate authentication data, from the user.

If the service control access module 508 is able to authenticate (818) the identity of the user, based on details stored in the account data store, the service control access module 508 provides (814) the user access to the request service. Otherwise, the service control access module 508 denies (820) access to the requested service.

The service control access module 508 may provide access (814) to the service in any suitable manner including, for example, by providing access through the service control access module 508, or by redirecting the user's browser to a URI associated with the requested service.

When the service control access module 508 provides access (814) to a service it may, in one example, suitably configure the service for the role type associated with the user requesting access to the service, thereby ensuring that the user requesting access to the service is provided with the appropriate level of access. In another example, when the service is accessed it obtains details of the user's service access level from the user's account stored in the user account store, and ensures that the user has access to functionality in accordance with their associated service access level or role type.

As previously mentioned as client organization users access services the service control access module 508 tracks the number of users by storing details of users accessing a service. In one example these details are stored in a service management file (not shown).

The service management file may also be accessible to at least some of the client organization users, such as users having a privileged role. In this way, an administrator user, such as the requesting user, may manage the list of users who have access to the service and may, for example, delete users who are no longer to have access to the service, may change the role type associated with each user, and perform other common administrator type tasks. In some examples of the invention, users with administrative roles may be able to view or administer other user accounts, for example, to check that the right users have the right levels of access, to modify role types associated with a user, and so on.

In further example the service control access module 508 includes a billing module (not shown) that enables the service provider to bill for use of the services by the client organization users. In one example, the billing module calculates a bill based on the actual number of users having accessed the service, as opposed to the number of users initially requested by the requesting user. This may, for example, allow a client organization to achieve important savings compared to conventional billing approaches.

In a still further example the service request received by the service control access module 508 may include, in addition to the maximum number of users who are to be given access to the service, a maximum number of concurrent users who are to be able access the service. In this example, the service control access module 508 performs an additional check, before granting access to the service, to ensure that the number of users currently using the service does not exceed the requested maximum number of concurrent users.

For example, a requesting client may request the maximum number of users to have access to a service to be 10000, and the maximum number of concurrent users to be 5000. This may be useful, for example, if the client organization is geographically distributed among different time zones, and that only a portion of the client organization users will be using the service at any one time. In this way, the service provider system may be able to provide the service using less resources (such as in step 608), and consequently may be able to provide the service at a reduced cost.

The examples described above may provide significant advantages to both the service provider and a client organization. For the service provider, the above examples enable a client organization to order service access for multiple client organization users, without requiring, or requiring only limited, human intervention by the service provider. Consequently, this may lead to a reduction in service provider costs which in turn may enable a service provider to provide services at lower cost to clients. For the client organization, the above examples enable the client organization to order service access and distribute access details to the client organization users needing service access. Furthermore, a client organization administrator may directly manage who within their organization has continuing access to a service, by being able to directly modify, on the service provider system, lists of users and their associated service access levels or roles.

It will be appreciated that examples and embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the present invention. Accordingly, examples provide a program comprising code for implementing a system or method as claimed in any preceding claim and a machine readable storage storing such a program. Still further, examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of accessing a service, comprising:
   receiving, at a processor-based system, a request from a requestor for a maximum number of users of an entity to have access to the service;
   based on the maximum number of users in the request, allocating, by the system, resources to ensure that the service is provided to the maximum number of users;
   generating, by the system, service access data associated with the service;
   providing, by the system, the generated service access data to the requestor for distribution to the users of the entity, wherein the service access data is to be used by the users of the entity to register and access the service; and
   monitoring, by the system, a total number of users of the entity accessing the service to ensure that the total number of users of the entity accessing the service does not exceed the maximum number of users of the entity allowed to access the service,
   wherein receiving the request comprises receiving a request including a first request for a first number of a plurality of users of the entity to have access to the service with a first service access level, and a second request for a second number of a plurality of accessing users to have access to the service with a second service access level; and
   wherein generating the service access data comprises:
   generating a first portion of service access data in response to the first request, and a second portion of service access data in response to the second request.

2. The method of claim 1, wherein receiving the request further comprises receiving a request for a particular service access level for the users of the entity.

3. The method of claim 2, wherein generating service access data includes generating service access data associated with the requested service access level.

4. The method of claim 1, further comprising:
receiving service access data from one of the users of the entity; and
providing the service to the user with a service access level associated with the received service access data.

5. The method of claim 1, wherein generating service access data includes generating service access data based on a characteristic of the requestor.

6. The method of claim 1, further comprising:
in response to a determination that the total number of users from the entity currently having access to the service has reached the maximum number of users for the entity, deny the user, access to the service.

7. A system for accessing a service provided by a service management system, comprising:
a processor; and
a memory storing instructions that when executed by the processor cause the processor to:
receive a request from a requestor for a maximum number of users of an entity to have access to the service,
based on the maximum number of users in the request, allocate resources to ensure that the service is provided to the maximum number of users,
generate service access data associated with the service,
provide the generated service access data to the requestor for distribution to the users of the entity, wherein the service access data is to be used by the users of the entity to register and access the service, and
monitor a total number of users of the entity accessing the service to ensure that the total number of users of the entity accessing the service does not exceed the maximum number of users of the entity allowed to access the service,
wherein the instructions are to cause the processor to:
receive, from the requestor, a request including a first request for a first number of users of the entity to have access to the service with a first service access level and a second request for a second number of users of the entity to have access to the service with a second service access level, and
generate a first portion of service access data in response to the first request, and a second portion of service access data in response to the second request.

8. The system of 7, wherein the instructions are to cause the processor to provide the service to the user with a service access level associated with the received service access data.

9. The system of claim 7, wherein, in response to a determination that the total number of users from the entity currently having access to the service has reached the maximum number of users for the entity, the instructions are to cause the processor to deny the user, access to the service.

10. A non-transitory computer-readable medium that stores machine readable instructions that when executed by a processor cause the processor to:
receive a request from a requestor for a maximum number of users of an entity to have access to the service,
based on the maximum number of users in the request, allocate resources to ensure that the service is provided to the maximum number of users,
generate service access data associated with the service,
provide the generated service access data to the requestor for distribution to the users of the entity, wherein the service access data is to be used by the users of the entity to register and access the service, and
monitor a total number of users of the entity accessing the service to ensure that the total number of users of the entity accessing the service does not exceed the maximum number of users of the entity allowed to access the service,
wherein the machine readable instructions are to cause the processor to:
receive, from the requestor, a request including a first request for a first number of users of the entity to have access to the service with a first service access level and a second request for a second number of users of the entity to have access to the service with a second service access level, and
generate a first portion of service access data in response to the first request, and a second portion of service access data in response to the second request.

11. The non-transitory computer-readable medium of 10, wherein the machine readable instructions are to cause the processor to provide the service to the user with a service access level associated with the received service access data.

12. The non-transitory computer-readable medium of claim 10, wherein, in response to a determination that the total number of users from the entity currently having access to the service has reached the maximum number of users for the entity, the machine readable instructions are to cause the processor to deny the user, access to the service.

* * * * *